(12) United States Patent
De Rijck (10) Patent No.: US 7,401,329 B2
(45) Date of Patent: Jul. 15, 2008

(54) COMPILING COMPUTER PROGRAMS TO EXPLOIT PARALLELISM WITHOUT EXCEEDING AVAILABLE PROCESSING RESOURCES

(75) Inventor: Bert De Rijck, Holsbeek (BE)

(73) Assignee: ARM Limited, Cambridge (GB)

( * ) Notice: Subject to any disclaimer, the term of this patent is extended or adjusted under 35 U.S.C. 154(b) by 633 days.

(21) Appl. No.: 11/113,307

(22) Filed: Apr. 25, 2005

(65) Prior Publication Data

US 2006/0242633 A1 Oct. 26, 2006

(51) Int. Cl.
G06F 9/45 (2006.01)
(52) U.S. Cl. ............... 717/161; 717/151; 717/152; 717/153; 717/154; 717/155; 717/156; 717/158
(58) Field of Classification Search ............ 717/161, 717/151, 152, 153, 154, 155, 156, 158, 141, 717/149; 707/100
See application file for complete search history.

(56) References Cited

U.S. PATENT DOCUMENTS

| | | | | |
|---|---|---|---|---|
| 5,367,651 | A * | 11/1994 | Smith et al. | 717/151 |
| 5,606,698 | A * | 2/1997 | Powell | 717/161 |
| 5,706,503 | A * | 1/1998 | Poppen et al. | 707/100 |
| 5,819,088 | A * | 10/1998 | Reinders | 717/161 |
| 6,367,067 | B1 * | 4/2002 | Odani et al. | 717/154 |
| 6,457,173 | B1 * | 9/2002 | Gupta et al. | 717/149 |
| 6,611,956 | B1 * | 8/2003 | Ogawa et al. | 717/152 |
| 7,146,606 | B2 * | 12/2006 | Mitchell et al. | 717/141 |
| 2004/0073899 | A1 * | 4/2004 | Luk et al. | 717/158 |
| 2006/0005176 | A1 * | 1/2006 | Kawahara et al. | 717/149 |
| 2007/0169042 | A1 * | 7/2007 | Janczewski | 717/149 |
| 2007/0198971 | A1 * | 8/2007 | Dasu et al. | 717/156 |
| 2008/0034356 | A1 * | 2/2008 | Gschwind | 717/149 |

OTHER PUBLICATIONS

Chekuri, et al. "Profile-Driven Instruction Level Parallel Scheduling with Application to Super Blocks", 1996, IEEE, p. 58-67.*
Engels, et al. "Parallel Processor Scheduling with Delay Constraints", 2001, Society for Industrial and Applied Mathematics, p. 577-585.*
Leung, et al. "Scheduling Time-Constrained Instructions on Pipelined Processors", 2001, ACM, p. 73-103.*
Xiao, et al. "Instruction Scheduling of VLIW Architectures for Balanced Power Consumption", 2005, IEEE, p. 824-829.*

* cited by examiner

Primary Examiner—Mary Steelman
Assistant Examiner—Qamrun Nahar
(74) Attorney, Agent, or Firm—Nixon & Vanderhye P.C.

(57) ABSTRACT

A compilation technique for computer programs forms a data flow graph of vertices which are analysed to form clusters C for parallel execution where those clusters are added to up to the point at which arbitrary selection between further vertices C, D to be added must be made. This data flow graph with these small clusters is then scheduled such that the clusters do not overlap with other clusters or with vertices outside of clusters. This starting point scheduled data flow graph is then subject to iterative processing whereby a window of timestamps is analysed to see if a candidate cluster formed by the parallel execution of the vertices within that window will result in faster execution whilst avoiding exceeding architectural constraints, such as register occupancy. If the rescheduled vertices do improve performance without exceeding architectural constraints, then this new schedule is adopted and the following vertices are subject to an adjustment in their timestamps to account for this. A window at a different point within the schedule is then adopted and an attempted rescheduling examined. This process is repeated until no progress is being made in reducing the overall execution time.

10 Claims, 8 Drawing Sheets

COMPILING COMPUTER PROGRAMS TO EXPLOIT PARALLELISM WITHOUT EXCEEDING AVAILABLE PROCESSING RESOURCES

BACKGROUND OF THE INVENTION

1. Field of the Invention

This invention relates to the field of compiling computer programs. More particularly, this invention relates to the compilation of computer programs to exploit available parallelism within a target processing system without exceeding the available processing resources within that target processing system.

2. Description of the Prior Art

It is known to provide compilation techniques by which a computer program written in a high level computer language can be automatically analysed by a compiler program to generate low level program, or machine instructions, which can be used by processing hardware to execute the high level program. It is important that the compiler should generate code which is able to efficiently and rapidly execute the desired high level program. Efficiency can be considered in a variety of different ways, and includes fast execution and execution which does not consume excessive processing resources, such as register resources, memory, bandwidth or the like.

A known class of data processing systems are VLIW (very long instruction word) processors which provide a high degree of parallelism through the provision of multiple processing units and independent data paths. Such VLIW processors are particularly well suited for many DSP type operations where large volumes of data need to be processed rapidly and efficiently. It is important within such VLIW processors with their high degree of parallelism that the computer program compilers are able to generate appropriate VLIW instructions that properly exploit the parallelism potential of the hardware concerned.

Within compiler operations it is known that a computer program to be compiled will be analysed to generate a data flow graph in which vertices represent data processing operations performed and the links between these vertices (edges) represent data sources or data syncs. When such a data flow graph has been generated, it can be used by the compiler to properly analyse the data flow and dependencies associated with the computer program to be compiled and accordingly facilitate the generation of efficiently compiled computer code as output. A typical known strategy when analysing a data flow graph and attempting to schedule the various processing operations represented by the vertices is to schedule these to be performed either as soon as possible, or as late as possible, in accordance with the dependencies discovered. Whilst this tends to improve the degree of parallelism achieved it can result in the available processing resources of the system being exceeded, e.g. the available number of registers for storing operands may be exceeded resulting in slow and inefficient spills to memory. It will be appreciated that simply scheduling an operation to be performed as soon as possible may not be efficient since that operation will consume register resources as soon as it is scheduled and may compete with other operations which will require those resources even though the overall speed of operation would not be adversely impacted if the processing operation was scheduled to commence later.

Within the field of VLIW processor, clustering is known based upon data flow and matrix heuristics. Such matrix heuristic assume certain behaviour and characteristic which may not in fact be generally applicable and may focus on only some limitations.

The present technique seeks to address the above problems and provide a system which is able to generate efficiently compiled computer code which exploits parallelism to high degree whilst avoiding exceeding available processing resources in an undesirable fashion.

SUMMARY OF THE INVENTION

Viewed from one aspect the present invention provides a method of compiling a computer program, said method comprising the steps of:

(i) forming from said computer program a data flow graph corresponding to a plurality of linked vertices, a vertex representing a data processing operation performed by said computer program and a link between vertices representing data flow between data processing operations;

(ii) associating linked vertices within said data flow graph to form clusters of linked vertices corresponding to data processing operations to be scheduled together for execution, said clusters being grown with vertices being added to a cluster until an arbitrary selection of a next vertex to be added to said cluster has to be made between two or more vertices;

(iii) scheduling said vertices within each cluster and then scheduling said clusters for non-overlapped execution to form a current schedule and associating a timestamp with vertices within said clusters indicative of a scheduled time of execution;

(iv) disassociating said vertices within said clusters;

(v) associating a plurality of vertices adjacent in timestamp order to form a candidate cluster, vertices being added to said current candidate cluster until a threshold criteria for said current candidate cluster is exceeded whereupon adding of vertices to said candidate cluster is stopped;

(vi) rescheduling said vertices within said candidate cluster to form a candidate schedule;

(vii) determining if a time for execution of said vertices within said candidate cluster in accordance with said candidate schedule is less than with said current schedule and that said threshold criteria is not exceeded;

(viii) if said time for execution is less and said threshold criteria is not exceeded, then retaining said candidate schedule as a new current schedule for said vertices within said candidate cluster and rescheduling and modifying timestamps for following vertices within said data flow graph to compensate for said new current schedule;

(ix) if said time for execution is not less or said threshold criteria exceeded, then discarding said candidate schedule and retaining said current schedule;

(x) if attempted rescheduling of a sufficient proportion of said vertices of said data flow graph has not been performed, then returning to step (v) to start forming a next candidate cluster starting from a vertex having different starting timestamp;

(xi) if rescheduling of at least one candidate cluster has reduced said time for execution of said computer program sufficiently in accordance with a convergence criteria, then returning to step (v); and (xii) if rescheduling of at least one candidate cluster has not reduced said time for execution of said computer program sufficiently in accordance with said convergence criteria, then generating an output compiled computer program in accordance with said current scheduling.

The present technique analyses the data flow graph by scheduling the vertices to be executed in accordance with a relatively safe strategy which is unlikely to exceed available processing resources. More particularly, vertices are scheduled where these may be grouped together (clustered) to be executed in parallel (or at least overlapping) since they have strong dependencies therebetween and the selection of which vertices are scheduled together is not arbitrary in the sense of involving a choice between two or more equally likely candidate vertices to be scheduled within the current cluster. Once these starting clusters have been assembled and scheduled within themselves, they are then scheduled as a whole such that they are executed in a non-overlapping fashion. The vertices within the overall schedule are time stamped to produce a collection of time stamped vertices which will execute without exceeding a threshold criteria, such as available processing resources, but as yet relatively inefficiently with a low level of parallelism.

The process then proceeds to form new candidate clusters of vertices from adjacent time stamped vertices within the list to see if these can be rescheduled to execute more rapidly without exceeding available processing resources. This first level of checking upon-available resources is based upon a heuristic estimate of the effect of the newly formed candidate cluster. When a suitable candidate cluster has been identified, then this is rescheduled to form a candidate schedule at which time it can be more accurately determined whether or not the available processing resources will in fact be exceeded by that rescheduled candidate cluster. If the time for execution which is determined following the rescheduling is less than that which was previously associated with the group of vertices which are within the candidate cluster, then the rescheduled form is maintained providing the available processing resources have not been exceeded. If the time taken is greater or the available processing resources have been exceeded, then the candidate schedule is rejected. The data flow graph of time sampled vertices is iteratively modified in this way attempting to collapse the time stamped vertices into larger clusters which are executed in parallel, or in overlapping fashion, without the available processing resources being exceeded. When the rate of improvement within the processing time for the program overall falls below a certain level then the iterative process may be terminated and the resulting rescheduled vertices used to generate the compiled computer program.

Whilst the present technique has general applicability for most computer program compilation, it is particularly well suited to VLIW devices due to their high level of parallel processing capability which may be exploited.

The processing resources which should be monitered so that they are not exceeded resulting in inefficiency can take a variety of different forms, but typically include available data storage registers, available execution units, available memory and/or available data transfer bandwidth.

When the time stamped vertices are processed so as to associate vertices adjacent in time stamped order, this could take place in a variety of different orders providing different windows of time stamps are attempted to be combined on different iterations. However, an efficient and logical way of processing the time stamped set of vertices is to traverse the vertices forming the data flow graph in time stamp order.

The forming of a next candidate cluster could be attempted starting at any different position within the time stamp list of vertices but conveniently and methodically the system starts with the next time stamp vertex following that previously processed and included within the preceding candidate cluster.

The termination condition by which a sufficient proportion of the vertices have been subject to attempted parallel scheduling could take a variety of different forms, and need not necessarily be complete, but overall efficiency has improved when such attempted rescheduling is performed for all of the vertices of the data flow graph.

The convergence criteria which eventually terminates the overall rescheduling operations for the computer program as a whole could again be based on a variety of different forms, such as the total processing time expended attempting rescheduling. However, an effective termination condition in practice is one which ceases rescheduling when no further reduction in time is achieved for a complete pass through the vertices of the data flow graph.

Viewed from another aspect the present invention provides a computer program product for controlling a computer to perform the above described technique. It will be appreciated that the computer program product could be a physical media, such as a disk, memory, CD, or other media, as well as a computer program carried over a transmission network or the like.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
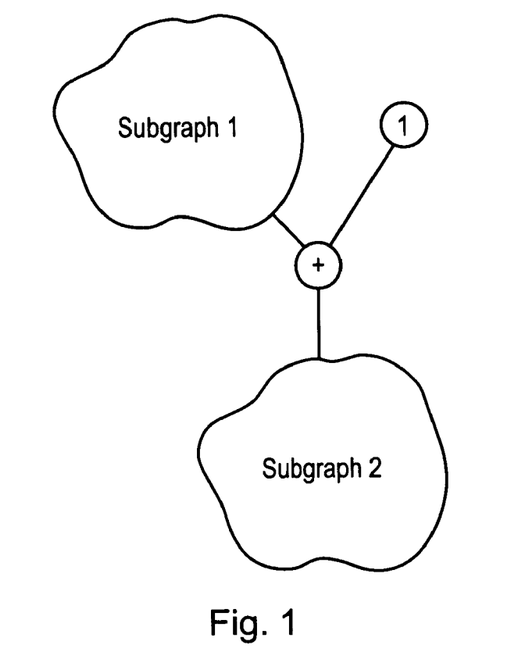
FIGS. 1 to 7 schematically represent a data flow graph of a highly simplified form subject to compilation in an attempt to improve parallelism without exceeding available processing resources.

FIG. 1 schematically illustrates a data flow graph representing an addition of an input vertex "1" with the outcome of Subgraph 1. The result is fed into Subgraph 2. The two subgraphs can themselves be of arbitrary form in terms of their internal dataflow graph. The following FIGS. 2 to 7 illustrate different ways in which the vertex "1" may be scheduled.

Figure 2:
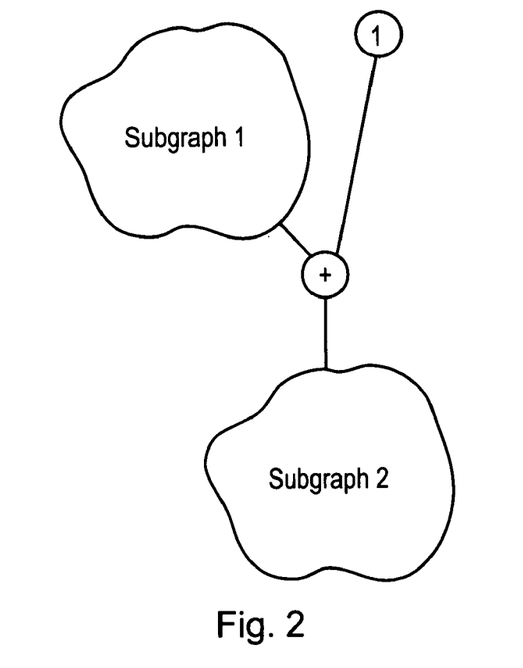

FIG. 2 illustrates the outcome after scheduling with a known list scheduler that schedules operations as soon as possible. In this example the vertex generating the value "1" is scheduled on the first possible time stamp. This results in the problem that the vertex "1" is scheduled unnecessarily far away from the "+" vertex which will consume this data as illustrated in FIG. 2. This leads to an unnecessarily long register occupation by the data value from vertex "1". This may in turn result in the available processing resources being exceeded with undesirable spills and other consequences.

Figure 3:
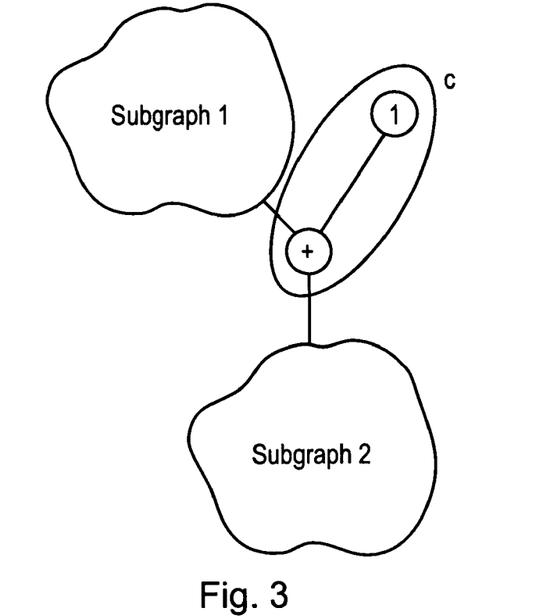

In FIG. 3, the original data flow graph of FIG. 1 has been subject to a clustering analysis in which the vertex "1" and the "+vertex" have been grouped together to form a cluster "C". The vertex "1" can be clustered together with the "+" vertex since it has no data flow on its inputs and accordingly can be unambiguously combined due to the strong data dependency without having to take any arbitrary decision as to which of a plurality of equally likely candidates should be combined together to be scheduled for parallel execution. Extending the cluster "C" further is not straightforward since the question then arises as to which vertices within the two subgraphs shown should or should not be combined into the cluster.

Figure 4:
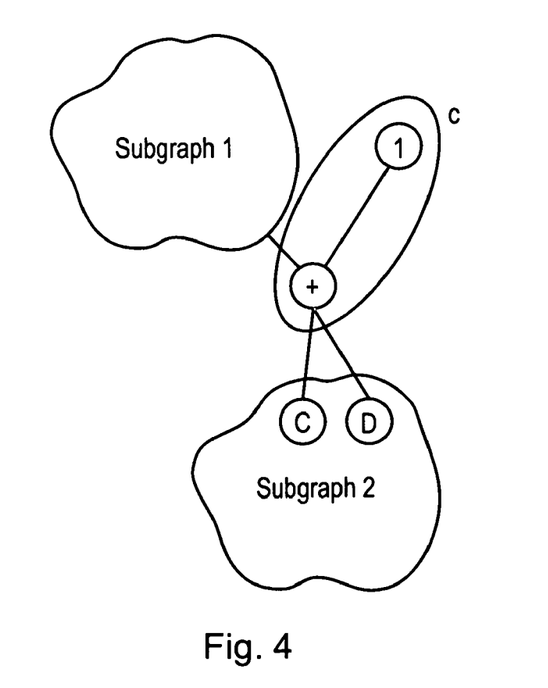

FIG. 4 illustrates the stopping of the clustering process when a non-straightforward (arbitrary) clustering decision has to be made. This figure shows the cluster "C" potentially being combined with either vertex "C" or vertex "D" or both. If vertex "C" is assigned to the cluster "C" and vertex "D" is not, then an arbitrary scheduling decision will have been made in that vertex "C" will become scheduled before vertex "D". This arbitrary decision is not based upon whether the combination shown resulting in attempted parallel execution is the most suitable and/or whether it will result in available processing resources being exceeded, e.g. register spills.

Figure 5:
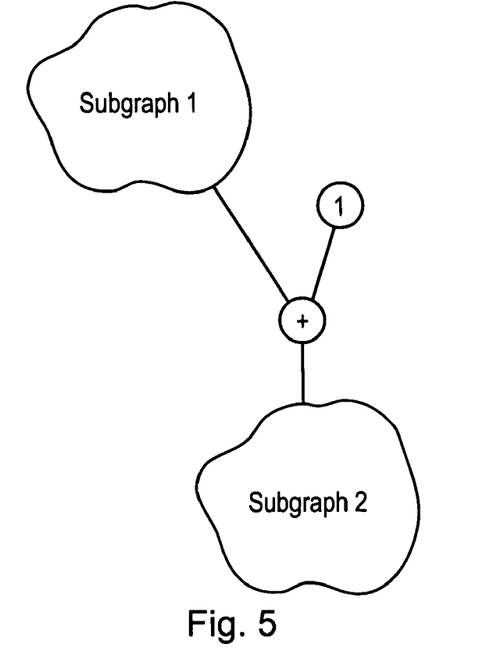

FIG. 5 illustrates the data flow graph of FIG. 1 which has now been scheduled in accordance with the present technique whereby the Subgraph 1, the cluster "C" of FIG. 3 and the Subgraph 2 have been scheduled to be non-overlapping. In accordance with this safe (but relatively low performance in terms of achieved parallelism) scheduling, the clusters do not overlap with other vertices or clusters so the vertex "1" is scheduled after the Subgraph 1. This scheduling produces a longer schedule than the one illustrated in FIG. 2, which is conventional list scheduling. This scheduling does however ensure that the vertex "1" is scheduled closer to the "+" vertex. This results in more efficient register occupation by avoiding the vertex "1" being scheduled too early.

Figure 6:
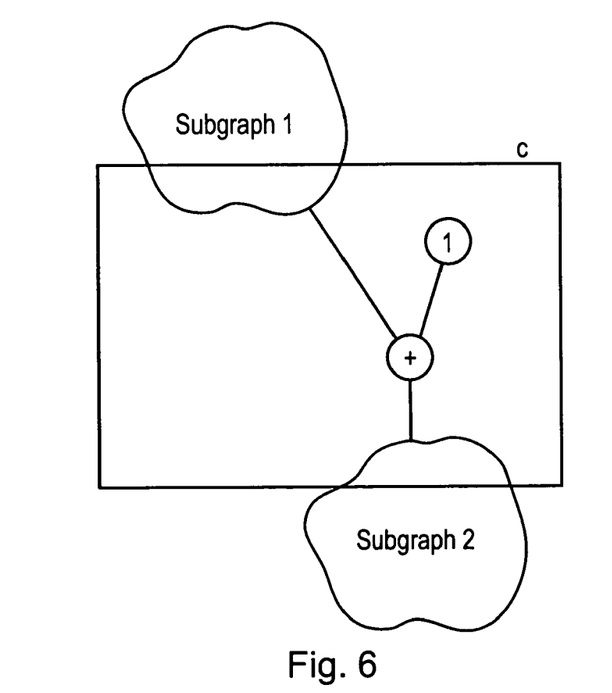

FIG. 6 illustrates the formation of potential candidate clusters based upon the initial safe scheduling of FIG. 5. This clustering to form a candidate cluster is performed based upon the order within the safe scheduling with adjacent vertices in timestamp order being potentially drawn in and added to the candidate cluster. FIG. 6 illustrates that the attempted new candidate cluster, as shown as the square box "C", contains part of Subgraph 1, vertices "1" and "+" and part of Subgraph 2. This cluster can be considered as a time stamp window within the originally formed safe scheduled data flow graph containing vertices that are scheduled to be executed within that window. Vertices are added to this cluster extending/growing the window until a heuristic test estimates that data processing resources of whatever form, be that registers, execution units, memory, transfer bandwidth etc, would be exceeded by any further addition. At this point, the candidate cluster can be rescheduled with all its included vertices and a determination made as to whether or not its rescheduled length in time is less than its original span of timestamps indicating that more efficient (parallel) processing has been achieved, whilst a determination is also made that the available processing resources have not been exceeded. If the rescheduled candidate cluster is quicker in execution without exceeding available processing resources, then it will be retained; otherwise, it will be discarded. The processing then proceeds to form a new window start at a next timestamp position into which vertices may be gathered to form a next candidate cluster for potential rescheduling whilst monitoring available processing resource use.

Figure 7:
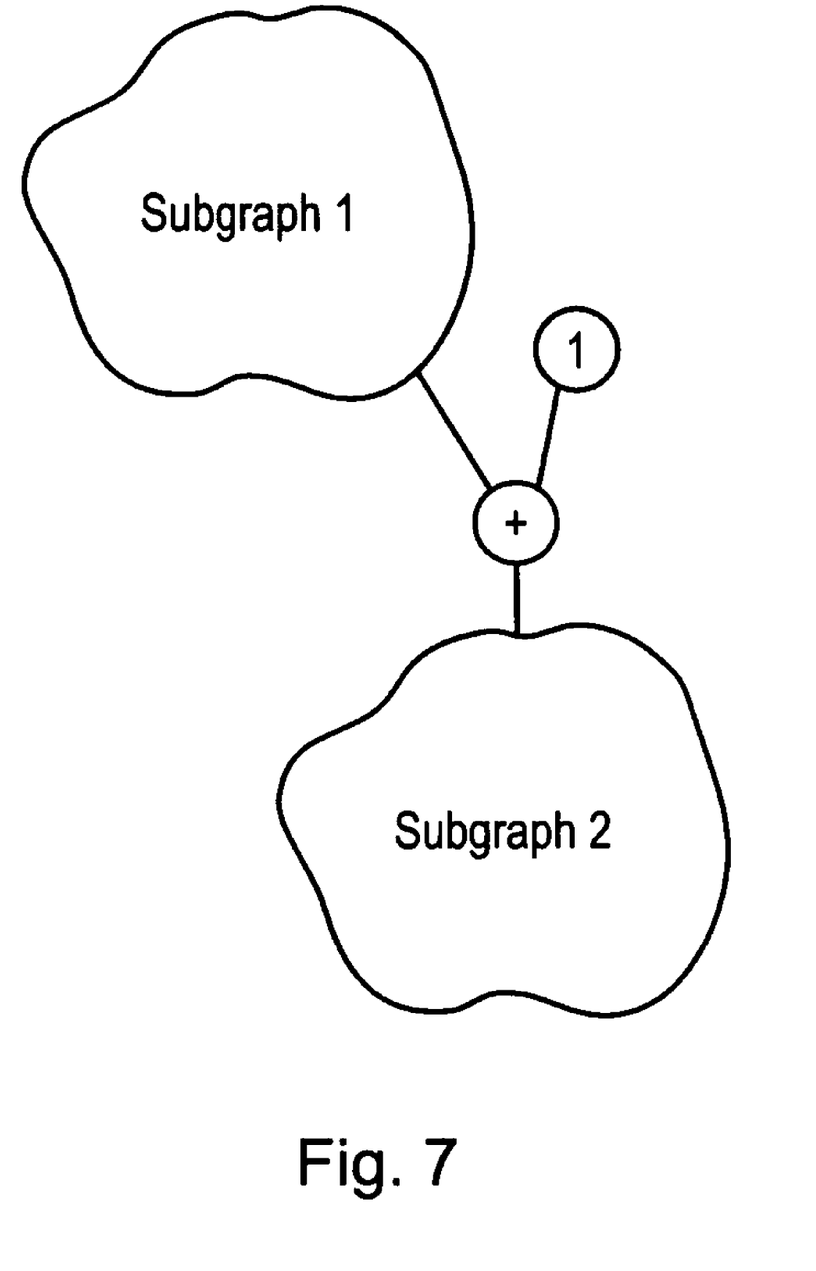

FIG. 7 schematically illustrates a final schedule. The difference compared to FIG. 2 is that the number of register spills has been decreased and the length shortened. Compared with the data flow graph of FIG. 5 the length has been considerably shortened compared to the highly safe scheduling which is initially performed.

Figure 8:
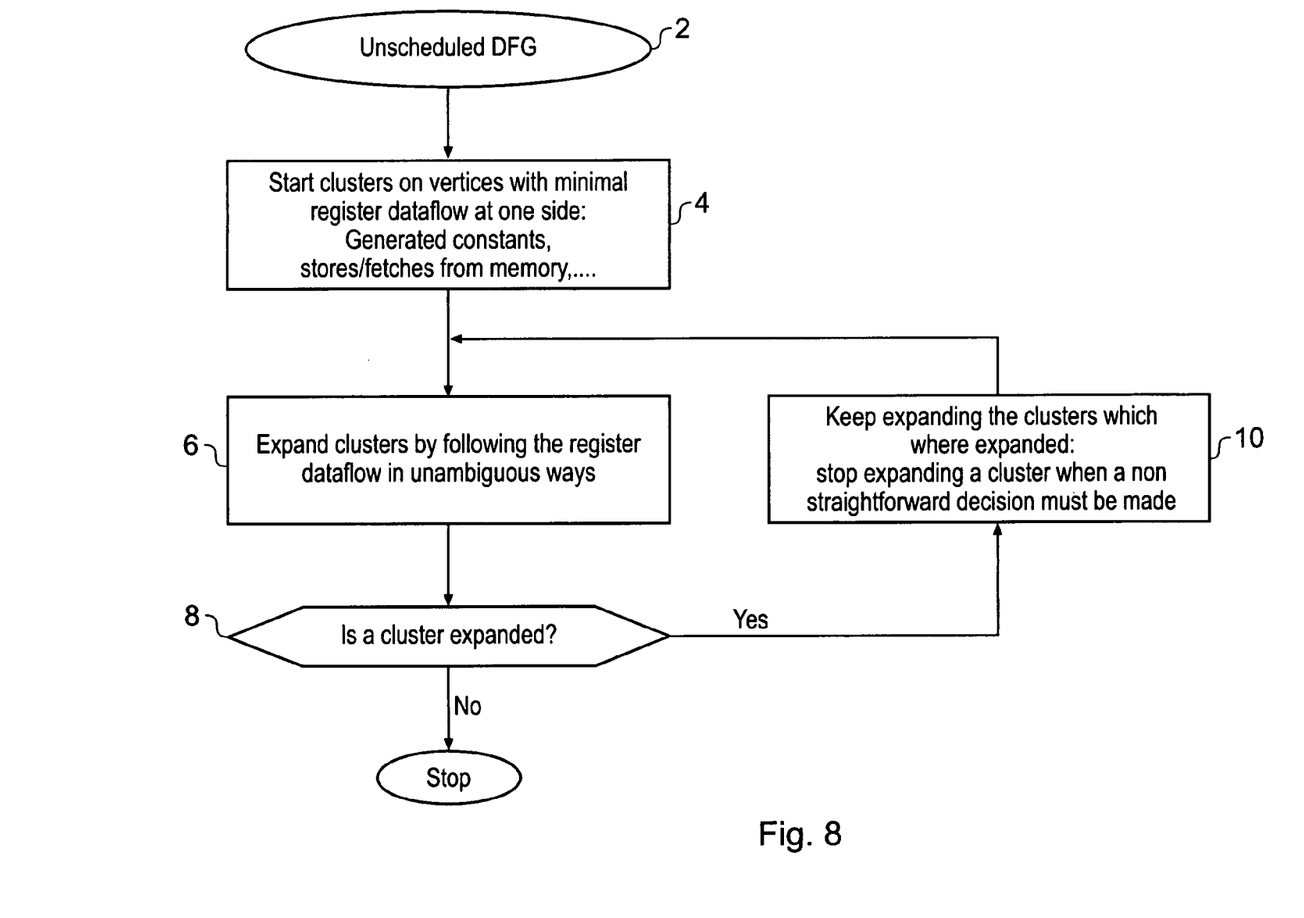
FIGS. 8 to 10 are flow diagrams schematically illustrating the compilation process whereby vertices are subject to iterative rescheduling whilst monitoring that available processing resources are not exceeded.

FIG. 8 is a flow diagram illustrating the processing performed. At step 2, an unscheduled data flow graph is formed from the input computer program to be compiled. At step 4 a set of initial clusters is formed by clustering vertices with minimal register data flow, such as generated constants, stores/fetches from memory etc. These clusters are then expanded at step 6 by following the register data flow in an unambiguous way, i.e. one that does not result in an arbitrary scheduling of one vertex before another vertex with its inbuilt assumptions. Step 8 checks whether the clusters being initially formed are continuing to expand and if so processing proceeds through steps 10 and 6 until an initial set of clusters is formed which are convex, mutually exclusive and do not include any arbitrary scheduling decisions and which can be scheduled to form an initial starting point for the iterative rescheduling process. It is assumed that the non-aggressive clustering and level of parallelism which will be achieved by the processing of FIG. 8 will not exceed the available data processing resources and accordingly such problems will not be present at the outset given the initial clusters formed.

Figure 9:
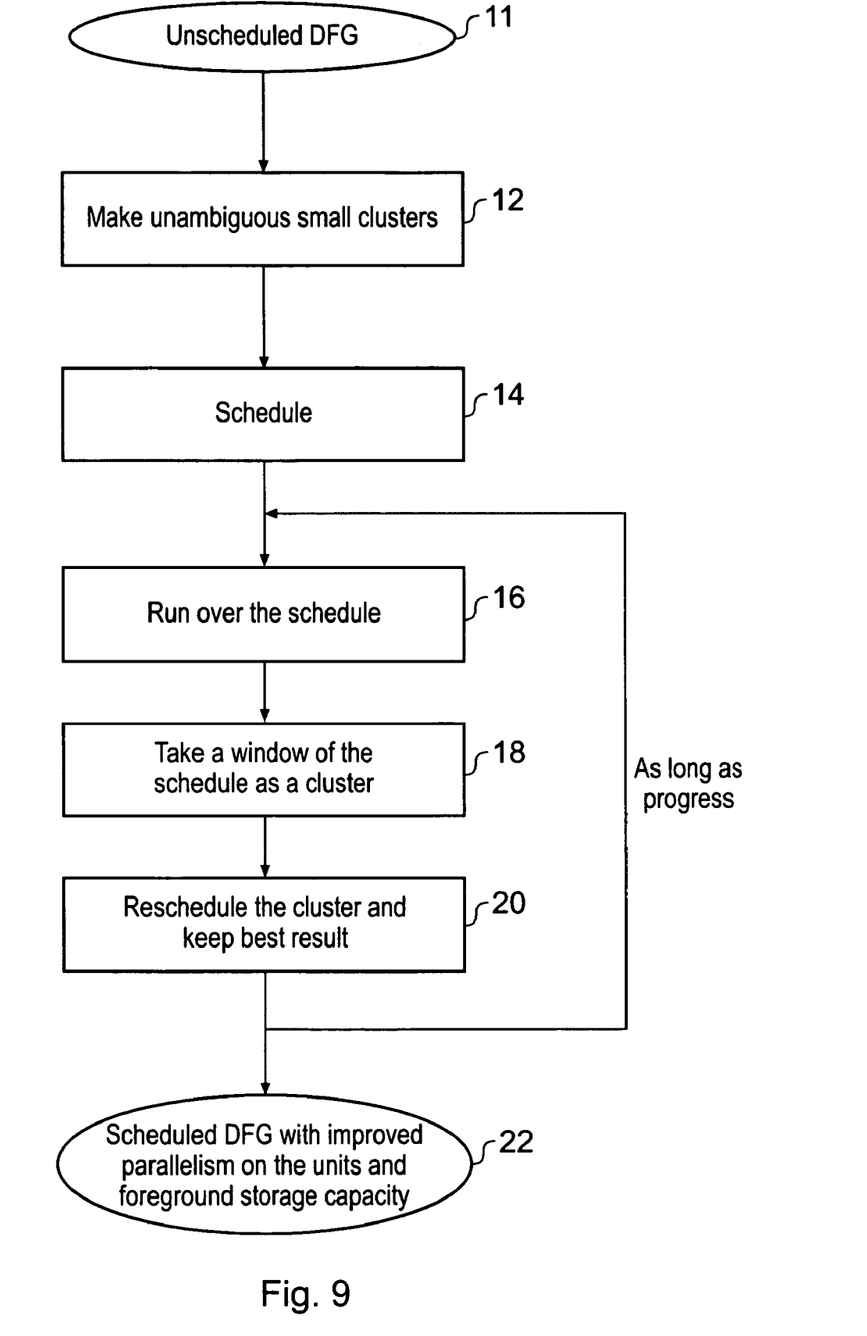

FIG. 9 illustrates at a high level the overall processing performed. Step 11 corresponds to the formation of the initially unscheduled data flow graph. Step 12 corresponds to the processing illustrated in relation to FIG. 8 whereby unambiguous small clusters are formed. These small clusters are scheduled at step 14 such that vertices within the small clusters may be scheduled in parallel but that the clusters themselves and vertices outside of the clusters are scheduled so as to be non-overlapping.

Step 16 starts by disassociating the previously formed clusters and parsing of the safe schedule which has been formed and a window of vertices within a given timestmp range within the schedule is examined at step 18 and a determination made as to whether or not these vertices can safely be scheduled together without exceeding the processing resources. Vertices are added into this cluster (i.e. the window expanded) until a safe limit upon the use of the processing resources is estimated as having been reached. Step 20 then schedules this new candidate cluster and a determination is made as to whether or not a reduction in processing time overall compared to the initial window has been achieved whilst it is confirmed that the available processing resources have not been exceeded in the rescheduled candidate cluster. As long as progress in reducing the overall execution time is achieved, then the steps 16, 18 and 20 are iterated. Finally, step 22 generates a scheduled data flow graph which can be used to produce the final compiled computer program with improved parallelism of execution and without exceeding storage capacity or other available processing resources.

Figure 10:
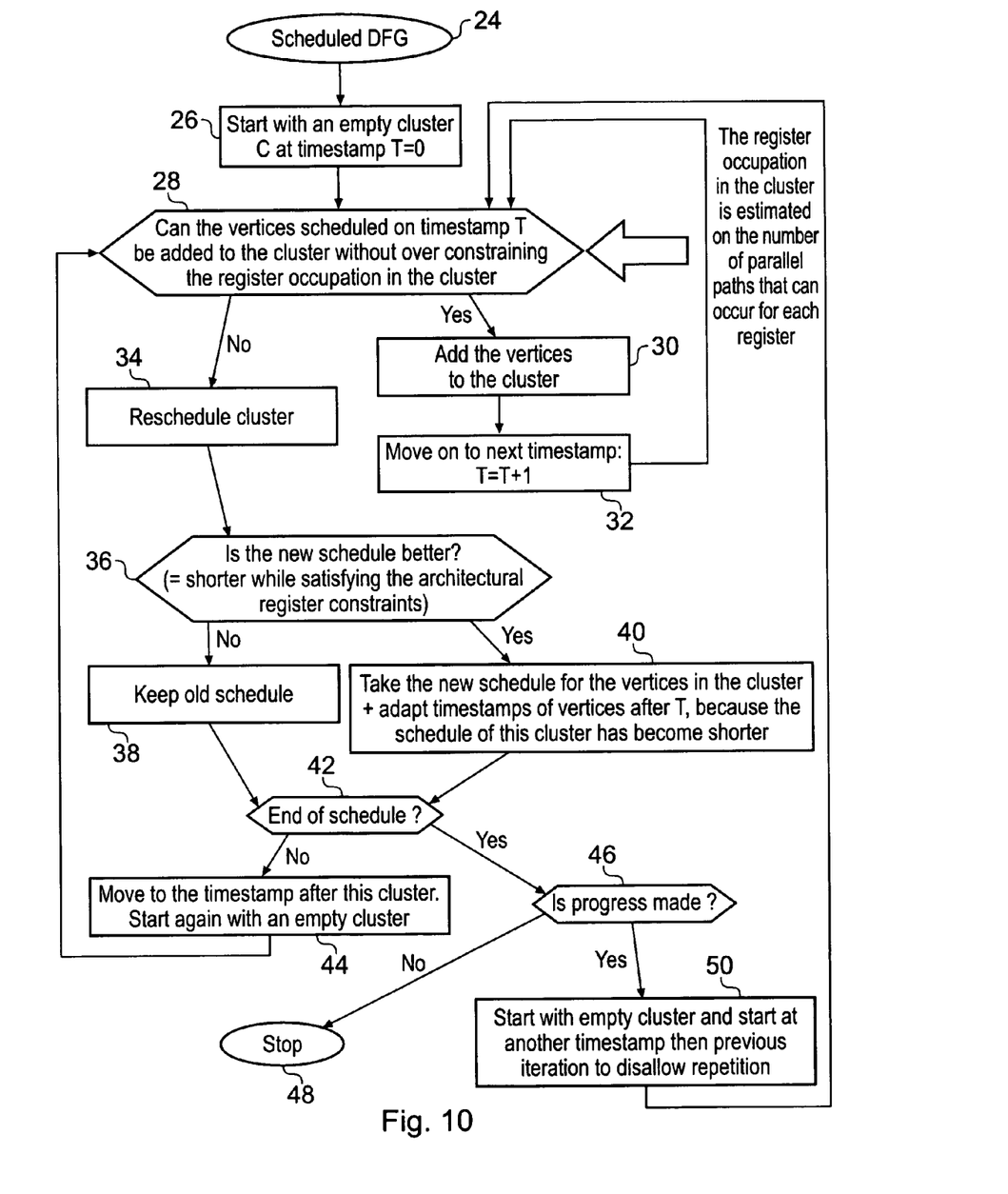

FIG. 10 illustrates the iterative analysis of the initially formed schedule in more detail. Input to this process at step 24 is the initially formed safe schedule of small clusters. At step 26 the system starts with an empty cluster at time stamp zero. Step 28 then determines whether or not other vertices sharing the current time stamp under consideration can be added to the cluster currently being formed without exceeding the available processing resources, such as over constraining the register occupation within the cluster. If such vertices can be added, then this is done at step 30 and the system moves onto the next timestamp at step 32 before returning processing to step 28. Step 28 makes a heuristic estimation of the processing resources consumed rather than actual determination. This estimation is based upon the number of parallel paths that can occur for each register.

Once no more vertices can be added to the current candidate cluster as determined at step 28, then processing proceeds to step 34 at which the cluster is rescheduled and the actual processing resource use determined. Step 36 then checks whether the new schedule results in a shorter overall time of execution whilst satisfying the architectural constraints, such as register use. If the determination is that no improvement was made, then processing proceeds to step 38 and the old schedule is retained. If an improvement has been made, then processing proceeds to step 40 at which the new schedule is adopted for the vertices in the candidate cluster and the timestamps of all of the following vertices within the data flow graph are adjusted to compensate for the new scheduling of the candidate cluster which has now been adopted since this cluster has become shorter.

After either step 38 or step 40, processing proceeds to step 42 where a determination is made as to whether or not the full scheduled data flow graph has yet been traversed. If the determination is that the full data flow graph has not yet been traversed, then processing proceeds to step 44 at which the time stamp for attempted generation of a next candidate cluster is advanced and processing is returned to step 28. If the full schedule has been traversed, then processing proceeds to step 46 where a determination is made as to whether or not progress in reducing overall execution time has been made since the last full traversal of the schedule. If no progress is being made, then processing terminates at step 48. Otherwise, processing proceeds to step 50 at which the system attempts to restart with an initial empty cluster and returns to step 28 starting from a timestamp different to the previous iteration so as to avoid repetition.

Figure 11:
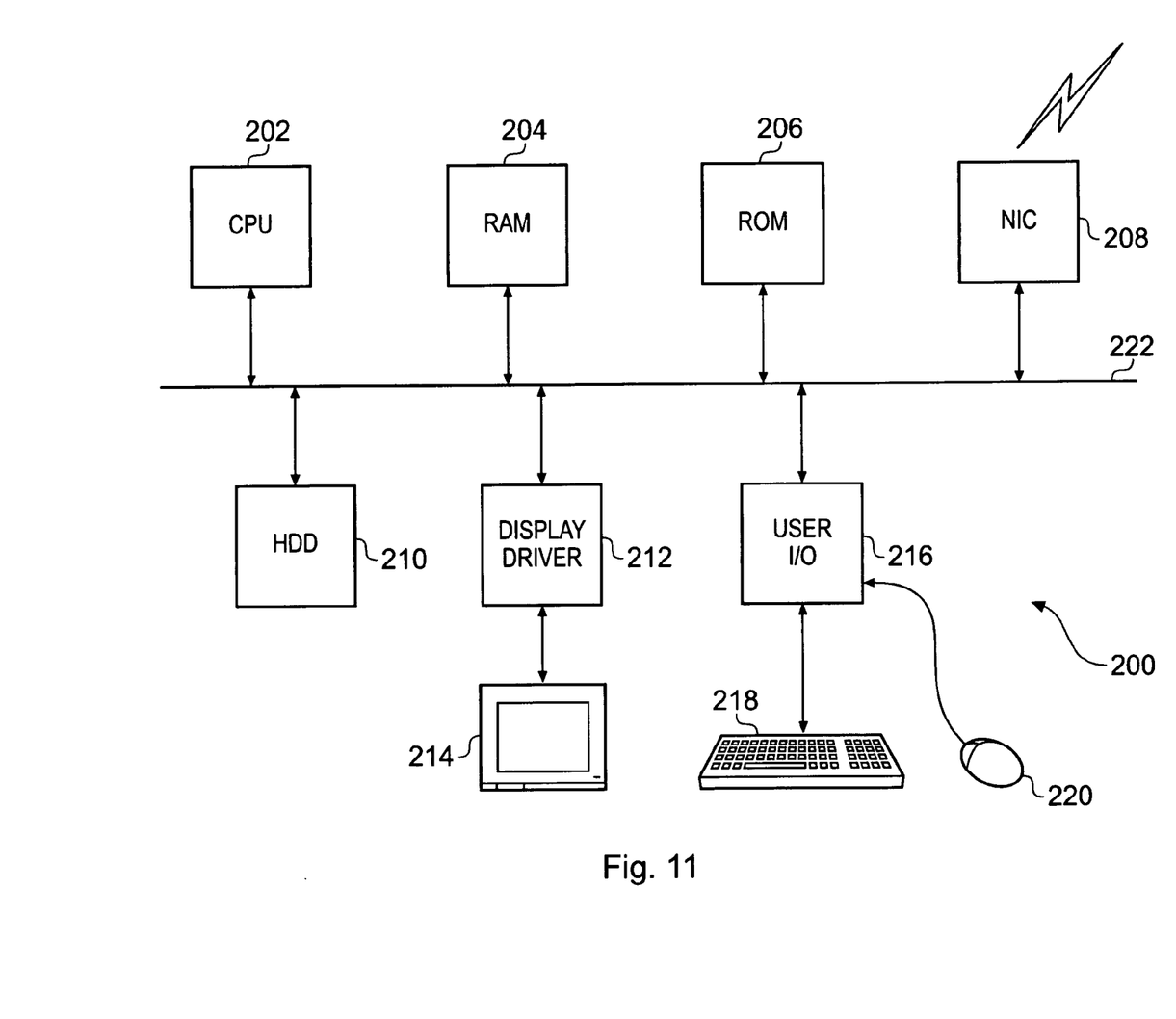
FIG. 11 is a schematic diagram of a general purpose computer which may be used to implement the above described techniques.

FIG. 11 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 11 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of compiling a computer program, said method comprising the steps of:
   (i) forming from said computer program a data flow graph corresponding to a plurality of linked vertices, a vertex representing a data processing operation performed by said computer program and a link between vertices representing data flow between data processing operations;
   (ii) associating linked vertices within said data flow graph to form clusters of linked vertices corresponding to data processing operations to be scheduled together for execution, said clusters being grown with vertices being added to a cluster until an arbitrary selection of a next vertex to be added to said cluster has to be made between two or more vertices;
   (iii) scheduling said vertices within each cluster and then scheduling said clusters for non-overlapped execution to form a current schedule and associating a timestamp with vertices within said clusters indicative of a scheduled time of execution;
   (iv) disassociating said vertices within said clusters;
   (v) associating a plurality of vertices adjacent in timestamp order to form a candidate cluster, vertices being added to a current candidate cluster until a threshold criteria for said current candidate cluster is exceeded whereupon adding of vertices to said candidate cluster is stopped;
   (vi) rescheduling said vertices within said candidate cluster to form a candidate schedule;
   (vii) determining if a time for execution of said vertices within said candidate cluster in accordance with said candidate schedule is less than with said current schedule and that said threshold criteria is not exceeded;
   (viii) if said time for execution is less and said threshold criteria is not exceeded, then retaining said candidate schedule as a new current schedule for said vertices within said candidate cluster and rescheduling and modifying timestamps for following vertices within said data flow graph to compensate for said new current schedule;
   (ix) if said time for execution is not less or said threshold criteria exceeded, then discarding said candidate schedule and retaining said current schedule;
   (x) if attempted rescheduling of a sufficient proportion of said vertices of said data flow graph has not been performed, then returning to step (v) to start forming a next candidate cluster starting from a vertex having different starting timestamp;
   (xi) if rescheduling of at least one candidate cluster has reduced said time for execution of said computer program sufficiently in accordance with a convergence criteria, then returning to step (v); and
   (xii) if rescheduling of at least one candidate cluster has not reduced said time for execution of said computer program sufficiently in accordance with said convergence criteria, then generating an output compiled computer program in accordance with said current scheduling.

2. A method as claimed in claim 1, wherein said threshold criteria is exceeding available processing resources.

3. A method as claimed in claim 1, wherein said computer program is a computer program for controlling processing operations performed by a VLIW device having a plurality of parallel data processing paths to be controlled.

4. A method as claimed in claim 2, wherein said available processing resources comprise one or more of:
   available data storage registers;
   available execution units;
   available memory; and
   available data transfer bandwidth.

5. A method as claimed in claim 1, wherein when performing step (xi) and returning to step (v) said associating linked vertices starts with a different timestamp.

6. A method as claimed in claim 1, wherein said arbitrary selection comprises an arbitrary scheduling decision.

7. A method as claimed in claim 1, wherein said step of forming a next candidate cluster starting from a vertex having different starting timestamp comprises forming a next candidate cluster starting from a vertex having next timestamp.

8. A method as claimed in claim 1, wherein said sufficient proportion of said vertices of said data flow graph comprises all of said vertices of said data flow graph.

9. A method as claimed in claim 1, wherein said convergence criteria comprises any reduction in time.

10. A computer program product comprising a computer program recording medium including a computer program operable to control a computer to perform a method as claimed in claim 1.

* * * * *